United States Patent [19]

Speca

[11] Patent Number: 5,064,796
[45] Date of Patent: Nov. 12, 1991

[54] SUPPORT ADJUVANT FOR IMPROVED VANADIUM POLYMERIZATION CATALYST

[75] Inventor: Anthony N. Speca, Kingwood, Tex.

[73] Assignee: Exxon Chemical Patents Inc., Linden, N.J.

[21] Appl. No.: 639,308

[22] Filed: Jan. 7, 1991

[51] Int. Cl.$^5$ .................................................. C08F 4/68
[52] U.S. Cl. ..................................... 502/107; 502/104; 502/117; 502/118; 502/119; 502/120; 502/126; 502/129; 502/132
[58] Field of Search ............... 502/104, 107, 117, 118, 502/119, 120, 126, 129, 132

[56] References Cited

U.S. PATENT DOCUMENTS

| | | | |
|---|---|---|---|
| 2,825,721 | 3/1958 | Hogan et al. | 260/88.1 |
| 2,951,816 | 9/1960 | Hogan et al. | 252/467 |
| 3,130,188 | 4/1964 | Hogan et al. | 260/94.9 |
| 3,165,504 | 1/1965 | Hogan | 260/94.9 |
| 3,304,295 | 2/1967 | Hagemeyer et al. | 260/93.7 |
| 3,340,319 | 9/1967 | Banks | 585/520 |
| 3,445,367 | 5/1969 | Kallenbach | 260/94.9 |
| 3,936,431 | 2/1976 | Reginato et al. | 260/88.2 R |
| 3,978,031 | 8/1976 | Reginato et al. | 526/352 |
| 4,011,382 | 3/1977 | Levine et al. | 526/96 |
| 4,077,904 | 3/1978 | Noshay et al. | 252/429 R |
| 4,100,337 | 7/1978 | Noshay et al. | 526/130 |
| 4,101,445 | 7/1978 | Levine et al. | 252/429 R |
| 4,130,505 | 12/1978 | Nasser, Jr. et al. | 252/432 |
| 4,194,073 | 3/1980 | McDaniel | 526/98 |
| 4,258,159 | 3/1981 | Bienfait | 526/114 |
| 4,262,105 | 4/1981 | Delbouille et al. | 526/124 |
| 4,302,565 | 11/1981 | Goeke et al. | 526/88 |
| 4,302,566 | 11/1981 | Carol et al. | 526/125 |
| 4,347,162 | 8/1982 | Invernizzi et al. | 252/429 B |
| 4,359,403 | 11/1982 | Hoff et al. | 252/429 |
| 4,376,191 | 3/1983 | Geck | 526/102 |
| 4,396,532 | 8/1983 | Bujadoux | 252/429 C |
| 4,507,449 | 3/1985 | Martin | 526/122 |
| 4,508,842 | 4/1985 | Beran et al. | 502/112 |
| 4,514,514 | 4/1985 | Martin | 502/121 |
| 4,559,318 | 12/1985 | Smith et al. | 502/110 |
| 4,578,374 | 3/1986 | Best | 502/115 |
| 4,593,009 | 6/1986 | Nowlin | 502/107 |
| 4,596,862 | 6/1986 | McDaniel et al. | 526/106 |
| 4,605,638 | 8/1986 | Nowlin | 502/104 |
| 4,634,750 | 1/1987 | Best | 526/129 |
| 4,634,751 | 1/1987 | Best | 526/129 |
| 4,657,997 | 4/1987 | Best | 526/129 |

FOREIGN PATENT DOCUMENTS 0099660 2/1984 European Pat. Off. .
1588643 4/1981 United Kingdom .

Primary Examiner—Patrick P. Garvin
Assistant Examiner—Brent M. Peebles
Attorney, Agent, or Firm—T. Dean Simmons

[57] ABSTRACT

A vanadium catalyst component for the polymerization of 1-olefins and a process for making said catalyst component are disclosed. The catalyst component is prepared by fluoriding a support comprising silica. Use of the catalyst component provides a catalyst with increased activity, increased response to hydrogen for chain termination, increased response to comonomer for resin density reduction, and allows the molecular weight distribution of the polymers to be independently controlled by controlling the amount of fluorination and the fluorination temperature.

20 Claims, No Drawings

SUPPORT ADJUVANT FOR IMPROVED VANADIUM POLYMERIZATION CATALYST

This application is a continuation-in-part of application Ser. No. 430,696 filed 11/1/89, now abandoned.

BACKGROUND OF THE INVENTION

1. Field of the Invention

This invention relates to a catalyst component and a process for preparing said catalyst component. The catalyst component may be employed with or without a cocatalyst in the polymerization of olefins to polyolefins. The process for preparing the catalyst component comprises the fluoriding of a support and further reaction of the support with a vanadium compound to produce a novel catalyst component which allows the molecular weight distribution of the polyolefins to be controlled by controlling the amount of fluorination and the fluorination temperature.

2. Description of the Prior Art

The use of vanadium-based catalysts in the polymerization of olefins is well known. When unsupported, vanadium catalysts usually assume the form of an oil or gum, and tend to cause fouling of the polymerization reactor. As a consequence, unsupported vanadium-based catalysts are unsuitable for use in a slurry or gas phase reaction process.

Supported vanadium catalysts suffer from the fouling problem to a lesser degree. However supported vanadium catalysts suffer from a series of shortcomings. First, supported vanadium catalysts tend to produce polymers having too broad molecular weight distributions (MWD), with the polymer including a significant amount of low molecular weight oligomers. These oligomers, when present in polymers used in the manufacture of blow molded articles, produce an unacceptable amount of smoke.

It would be highly desirable to have a supported vanadium catalyst which could be used in a gas or slurry phase polymerization process to produce polymer of narrower MWD for use in blow molding resin. Similarly, narrow MWD's are desirable for resin applications such as injection molding or linear low density polyethylene (LLDPE) film production.

For other applications, such as the manufacture of high density polyethylene (HDPE) films, it would be desirable to produce a high molecular weight resin having a broad MWD. In yet other applications, such as wire and cable coatings manufacture, it is desirable for the resin to have a MWD of intermediate breadth.

It would thus be desirable to have a supported vanadium catalyst for the production of high molecular weight polyolefins having an easily and accurately controllable MWD ranging from broad to narrow, as desired, depending on the intended use of the resin product. A clear need exists in the industry for a supported vanadium catalyst which can be tailored to provide resins of a specific MWD over a wide molecular weight range.

A second shortcoming of supported vanadium catalysts is that these catalysts, when used in the polymerization of ethylene or in the copolymerization of ethylene with other 1-olefins, exhibit low activity in comparison to supported titanium-based catalysts. It would thus be desirable to have a supported vanadium catalyst which would have increased activity.

A third shortcoming of supported vanadium catalysts is their need for relatively high levels of hydrogen during polymerization to control resin molecular weight. It would be desirable to have a supported vanadium catalyst that would have increased response to hydrogen for affecting chain termination and controlling molecular weight.

Finally, supported vanadium catalysts require relatively high levels of comonomer to prepare medium and low density resins. It would be desirable to have a supported vanadium catalyst which would have increased response to comonomer to effect resin density reduction. Good comonomer utilization means that less comonomer is needed to give the target resin density. This is important for both slurry and gas phase polymerization since large amounts of comonomer lead to upsets in process conditions by increasing the solubilizing power of the slurry diluent or forming droplets in the gas phase.

It is well known that fluorided supports can be used to advantage with chromium catalysts. In that context, fluorination increases chromium catalyst activity, narrows resin MWD, but decreases resin melt indices. Decreases in resin melt index (MI) are indicative of increased molecular weight and decreased response of the catalyst to hydrogen.

Fluorination of chromium catalyst supports was disclosed in U.S. Pat. Nos. 2,825,721, and 2,951,816. U.S. Pat. No. 3,130,188 described the use of ammonium silicofluoride in conjunction with supports for chromium-based catalysts. U.S. Pat. No 4,011,382 discloses a titanated and fluorided support for a chromium catalyst and notes that increasing the fluorine content, while improving the rate of incorporation of comonomer, also decreases the resin melt index.

Similarly, U.S. Pat. No. 4,077,904 describes a fluorided silica support for a chromium catalyst. The data show that fluorination decreased resin melt index and had no effect on MIR, i.e. that the average molecular weight increased while the MWD distribution remained unchanged.

The earliest mention of a vanadium compound associated with fluorine for olefin polymerization is in U.S. Pat. No. 3,304,295 in connection with an unsupported catalyst mixture U.S. Pat. No. 4,262,105 discloses the fluorination of support material consisting of magnesium compounds for $TiCl_4$ catalysts for the polymerization of ethylene. U.S. Pat. No. 3,936,431 covers fluorided alumina-silica and alumina-calcium oxide as supports. Similarly, U.S. Pat. No. 4,258,159 discloses fluorided alumina and magnesium chloride as supports for titanium alkoxide catalysts.

U.S. Pat. No. 4,359,403 teaches the addition of fluorine-containing compounds to silica prior to or during heating for the sole purpose of improving the activity of the silica supported catalyst. The catalyst is prepared by reacting the fluorided silica with a magnesium compound and then with the active metal. The patent also teaches the addition of alcohol for the purpose of improving the catalyst response to hydrogen. No mention is made of improved hydrogen response or comonomer response caused by the fluorination, nor is any mention made of the ability to control molecular weight distribution through independent control of the amount of fluorination and the fluorination temperature.

SUMMARY OF THE INVENTION

This invention discloses a novel vanadium-based catalyst component and a method for producing said catalyst component. The catalyst component, when used alone or in conjunction with a cocatalyst, provides a catalyst system having unique properties for olefin polymerization, including increased catalytic activity, increased response to hydrogen for chain termination, and increased response to comonomer for controlling resin density. The catalyst system of the invention provides the ability to control the molecular weight distribution through independent control of the amount of fluorination and the temperature at which the support is fluorinated.

While fluorination of supports for vanadium-based catalysts, as taught by the present invention has the effect of increasing catalyst activity and narrowing MWD's, fluorination also, unexpectedly, has the effect of increasing resin melt indices, i.e. increasing hydrogen response. In addition, fluorination in accordance with the present invention decreases resin density which is indicative of increased comonomer response.

In view of the high activity of the catalyst system of this invention it is generally not necessary to deash the polymer product since it will generally contain lower amounts of catalyst residues than polymer product produced in the presence of conventional catalyst.

The ability of this catalyst system to control the MWD of the polymer product through fluorination substantially eliminates the formation of low weight oligomer thereby reducing the amount of smoke and facilitating the use of a polyolefin resin produced by the catalyst system as a blow molding resin. Moreover, the flexibility provided by this catalyst in allowing the tailoring of the breadth of the MWD over a wide range of molecular weights by varying the extent of fluorination and/or the fluorination temperature, permits the production of polymers having properties optimally suited for specific applications.

The catalyst component disclosed in this invention may be used alone or in combination with an alkyl aluminum cocatalyst under conditions characteristic of Ziegler polymerization.

The process for producing this novel catalyst component comprises the steps of dry mixing a support material with a fluorine compound. The mixture is then heated to some desirable fluorination temperature. Next, the support material is treated with a vanadium compound. The catalyst component of this invention may be used to produce polymer having a desired MWD by judiciously selecting the fluorine content and the fluorination temperature.

The support material is selected from the group consisting of silica, alumina, silica-alumina mixtures, talc, zirconia, thoria, and metal oxides from the metals of Group IIA, IVA and IVB of the Periodic Table of the Elements. The fluorine compound is selected from the group consisting of $(NH_4)_2SiF_6$, $NH_4F$, $NH_4HF$, $NH_4BF_4$, $KF$, $AlF_3$, $HF$, $Zn(BF_4)_2$, $Ni(BF_4)_2$, $Sn(BF_4)_2$, $(NH_4)_2TiF_6$ and the like.

The disclosed catalyst may be employed, either by itself or in conjunction with a cocatalyst, in the gas phase, high pressure, solution, or slurry processes for the production of polyolefin resins. The catalyst may be usefully employed in the polymerization of ethylene and other alpha-olefins, particularly alpha-olefins having from 3 to 8 carbon atoms and in the copolymerization of these with other 1-olefins or diolefins, such as propylene, butene, pentene and hexene, butadiene, 1,4-pentadiene, and the like, so as to form copolymers of low and medium densities. The catalyst is particularly useful for the polymerization of ethylene and the copolymerization of ethylene with other alpha-olefins in gas phase processes to produce HDPE or LLDPE.

DESCRIPTION OF THE PREFERRED EMBODIMENTS

The catalyst component of the present invention comprises the solid reaction product of (A) a fluorine compound in the presence of an inert support material, (B) a vanadium compound, (C) an optional halogenating agent, and (D) an optional reducing agent. The catalyst component may optionally be reacted with (E) an organoaluminum compound cocatalyst to form a catalyst system. In accordance with this invention, the order of addition of ingredients in forming the vanadium containing catalyst can vary.

In a preferred embodiment of this invention, after the inert support material is treated with the fluorine compound, the next substantial reaction of the fluorided support material should be conducted with the vanadium compound. In this embodiment, where there is no substantial reaction between the fluorided support material and any other catalyst component prior to the reaction with the vanadium compound, the catalyst produced has the unexpected effect of increasing the melt indices of the resulting polymer.

It is not necessary in the preparation of the catalyst of this preferred embodiment for there to be complete isolation of the fluorided support from other catalyst components prior to contact between the fluorided support and the vanadium compound. It is only necessary that, at the time of addition of the vanadium compound, there should be enough remaining increased activity from the fluorination of the support so that the vanadium compound, and not some other catalyst component, will have substantial benefit of the fluorination of the support. Therefore, it is within the scope of this invention, that some catalyst components may be contacted with the fluorinated support in small reactive quantities prior to contact with the vanadium compound, as long as all of the benefits of fluorination are not used up prior to contact with the vanadium compound.

In the preferred embodiment of this invention, the silica support material is dry mixed with the ammonium silicofluoride fluorine compound. Both the silica and the ammonium silicofluoride are solid particulates. Dry mixing is accomplished by simply blending the two solids. Alternatively, the fluorine compound could be dissolved in water and sprayed onto the dry silica, or the fluorine compound could be dissolved in water and added to an aqueous suspension of the silica, or the dry fluorine compound could be added to an aqueous suspension of the silica. However, when the fluorine compound is a solid particulate, dry blending is preferred. The mixture is then heated to a desirable temperature. The amount of fluorine used and the temperature to which the mixture is raised influence the narrowness of the MWD of the polymers formed using the catalyst of this invention.

The support material can be any of the solid particulate porous supports such as talc, silica, zirconia, thoria, magnesia, and titania. Preferably the support material is a Group IIA, IIIA, IVA and IVB oxide in finely divided form. Suitable inorganic oxide materials which are desirably employed in accordance with this invention include silica, alumina, and silica-alumna and mixtures thereof, with silica being most preferred. Other inorganic oxides that may be employed either alone or in combination with the silica, alumina, or silica-alumina are magnesia, titania, zirconia, and the like.

The preferred fluorine compound is ammonium silicofluoride (ASF), $(NH_4)_2SiF_6$, but many other fluorine containing compounds may be used. Among the fluorine compounds which may be used are hydrogen fluoride, HF, fluorides of ammonium and metals, such as KF, KF.HF, $NH_4F$, $NH_4F.HF$, $AlF_3$, complex fluorides of ammonium and metals, $Sn(BF_4)_2$ and the like.

The fluorine treated support, slurried in a hydrocarbon, is treated with a vanadium compound. The preferred vanadium compounds which may be usefully employed in the preparation of the catalyst component of this invention are well known in the art and may be represented by the formulas:

$$VCl_x(OR)_{3-x}$$
$$\overset{\parallel}{O}$$

where "x" is a number from 0 to 3 and R is a hydrocarbon radical (2)
$$VCl_y(OR)_{4-y}$$

where "y" is a number from 3 to 4 and R is a hydrocarbon radical (3)
$$V(AcAc)_z^{(O)_{3-z}}$$

where "z" is a number from 2 to 3 and (AcAc) is an acetyl acetonate group, (4)
$$VCl_2(AcAc) \quad \text{or} \quad VCl(AcAc)_2$$
$$\overset{\parallel}{O} \qquad\qquad \overset{\parallel}{O}$$

where (AcAc) is an acetyl acetonate group, and (5)
$$VCl_3 \cdot nL$$

where "n" is a number from 2 to 3 and L is a Lewis base, such as tetrahydrofuran, which can form hydrocarbon-soluble complexes with $VCl_3$.

In formulas (1) and (2) above, R preferably represents a $C_1$ to $C_8$ aliphatic radical free of aliphatic unsaturation or an aromatic hydrocarbon radical such as a straight or branched alkyl, aryl, cycloalkyl, alkanyl, or aralkyl group, such as methyl, ethyl, propyl, isopropyl, butyl, n-butyl, i-butyl, t-butyl, pentyl, hexyl, cyclohexyl, octyl, benzyl, dimethyl, phenyl, naphthyl, and the like.

Illustrative, but not limiting examples of the vanadium compounds are vanadyl trichloride, vanadium tetrachloride, vanadium tetrabutoxide, alkoxy vanadium chloride, vanadium trichloride, vanadyl acetylacetonate, vanadyl dichloroacetylacetonate, vanadyl chlorodiacetylacetonate, vanadium trichloride complexed with tetrahydrofuran, vanadyl tribromide, vanadium tetrabromide, and the like.

The vanadium compound is preferably added to the reaction mixture in the form of a solution. The solvent can be any of the well-known inert hydrocarbon solvents such as hexane, heptane, benzene, toluene, and the like.

In accordance with this invention, the optional halogenating agents are employed to obtain increased catalytic activity. The halogenating agents may be used to increase activity without detrimentally affecting the molecular weight distributions obtainable in accordance with this invention in which the content of the oligomer is reduced. The halogenating agents which can be employed are chlorinating, brominating and iodinating agents. The halogenating agents are desirably strong halogenating agents although weaker halogenating agents may be used. The halogenating agents can be liquid or gaseous under the reaction conditions.

Illustrative but non-limiting examples of the strong halogenating agents that can be usefully employed in accordance with this invention are the silicon halides and the hydrocarbyl halides.

The silicon halides can be represented by the formula $X_aSiR_b^s$ in which X is a halogen, $R^s$ is hydrogen, alkyl, cycloalkyl or aryl radical containing 1 to 20 carbon atoms, "a"+"b"=4 and "a" is at least 1. Illustrative examples of the silicon compounds are silicon tetrachloride, silicon tetrabromide, chlorosilanes such as, for example, trichlorosilane, trimethylchlorosilane, dimethyldichlorosilane, ethyltrichlorosilane, diethyldichlorosilane, dichlorodibutylsilane, trichlorobutylsilane, tribromobutylsilane, bromotrimethylsilane, and the like.

Other halogenating agents are the hydrocarbyl halides which include carbon tetrachloride, chloroform, 1,1,1-trichloroethane, dichloromethane, trichlorofluormethane, and the like.

The preferred halogenating agents are strong activating chlorinating agents, among which the most preferred are silicon tetrachloride, trichlorofluoromethane, trichloroethane, and the like. Illustrative of weak activating chlorinating agents are the thionyl halides, such as $SOCl_2$.

The halogenating agent may be conveniently added to the reaction slurry consisting of the reaction product of the fluorided support material, the vanadium compound, and the organoaluminum compound. The halogenating agent may be added as a pure compound or in the form of a solution with an inert solvent such as, for example, an aliphatic hydrocarbon solvent or an aromatic hydrocarbon solvent, or int may be added as a gas.

The slurrying of the support material, as mentioned above, is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. The amount of solvent used is not critical. The amount employed should, however, be sufficient to provide adequate capability for heat transfer away from the catalyst components during reaction and to permit good mixing.

The catalyst component may optionally be reacted with a reducing agent. The reducing agent can be represented by the general formula $R'_mAlX_{3-m}$ wherein R' represents an alkyl group, cycloalkyl group or aryl group, X represents a halogen atom and "m" represents a suitable numeral equal to or greater than 1 and less than or equal to 3, or mixtures or complex compounds thereof. In particular, it is preferable to employ alkyl aluminum halide compounds wherein the alkyl groups have from 1 to 18 carbon atoms, preferably 1 to 9 carbon atoms and the halogen is chlorine. Illustrative but non-limiting examples of the organoaluminum compounds which may be suitably employed are the trialkylaluminums such as trimetylaluminum, triethylaluminum, tributylaluminum, triisobutylaluminum, tri-n-hexylaluminum, tri-n-octylaluminum, and the like. Illustrative examples of the diaklyaluminum halides are diethylaluminum chloride, diethylaluminum fluoride, dimethylaluminum chloride, dibutylaluminum chloride, diethylaluminum bromide, diethylaluminum iodide and dibutylaluminum iodide. Examples of the monoalkylaluminum dihalides are methylaluminum dichloride, ethylaluminum dichloride, butylaluminum dichloride, isobutylaluminum dichloride, ethylaluminum dibromide, ethylaluminum diiodide, butylaluminum dibromide, and butylaluminum diiodide. Moreover, the sesquihalides can be suitably employed such as methylaluminum sesquichloride and ethylaluminum sesquichloride and the like. Preferably, isobutylaluminum dichloride is used.

The alkylaluminum may conveniently be added to the agitated slurry containing the particulate supports in the form of a solution with a dry hydrocarbon such as hexane, benzene, toluene, and the like. Alternatively, the alkylaluminum may be added to the slurry in undiluted form.

The amounts of catalytic ingredients employed in the preparation of the supported catalyst component can vary over a wide range. The fluorine containing compound is added to the support at a concentration of about 0.01 to 1.0 millimoles F/g of dried support, preferably in the range of about 0.1 to about 0.6 millimoles F/g of dried support and especially in the range of about 0.2 to 0.4 millimoles F/g of dried support. The precise amount of fluorine containing compound added directly affects the narrowness of the MWD of the resulting polyolefins formed using the catalyst and must be judiciously selected to effect MWD's of desired breadth.

The reaction of the support material with the fluorine containing compound takes place at temperatures of from 200° C. to 1000° C., preferably from 350° C. to 800° C. The precise temperature to which the mixture is heated directly affects the narrowness of the MWD of the resulting polyolefins formed using the catalyst and must be judiciously selected to affect MWD's of desired narrowness.

The vanadium compound is added to the slurry of inert support at a concentration of about 0.05 to 2.0 millimoles V/g of dried support, preferably in the range of about 0.1 to about 1.5 millimoles V/g of dried support and especially in the range of about 0.2 to 1.0 millimoles V/g of dried support.

Generally, the reaction steps may be conducted at temperatures in the range of about −50° C. to about 150° C. Preferred temperature ranges are from about −30° C. to about 60° C. with −10° C. to about 50° C. being most preferred.

The catalyst components prepared in accordance with this invention are usefully employed with cocatalysts well known in the art of the Ziegler catalysis for polymerization of olefins. Typically, the cocatalysts which are used together with the transition metal containing catalyst component are organometallic compounds of Group Ia, IIa and IIIa metals such as aluminum alkyls, aluminum alkyl hydrides, lithium aluminum alkyls, zinc alkyls, magnesium alkyls and the like. The cocatalysts preferably used are the organoaluminum compounds. The preferred alkylaluminum compounds are represented by the formula $AlR'_nX'_{3-n}$ wherein $R'$ is hydrogen, hydrocarbyl or substituted hydrocarbyl group and n is as defined herein above. Preferably $R'$ is an alkyl group having from 2 to 10 carbon atoms. $X'$ is halogen and preferably chlorine. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum and aluminum triethyl being highly desirable.

Cocatalysts are added to the polymerization reactor at a molar ratio to V of about 50 to 250 however, greater or lesser amounts can be usefully employed. Preferably, the Al/V ratio is in the range of about 50 to about 150 and especially in the range of about 75 to 100.

Improved yields can be further obtained by employing polymerization promoters (activators) in combination with the catalyst system of this invention. The polymerization activators, in accordance with this invention, are preferably chlorocarbon activators. The activators are generally added to the polymerization reactor as a separate component. However, in the alternative, the activator can be adsorbed onto the surface of the catalyst component of this invention. The activator serves to significantly increase the productivity of the catalyst. Illustrative but non-limiting examples of the chlorocarbons are $CHCl_3$, $CFCl_3$, $CH_2Cl_2$, ethyltrichloroacetate, methyltrichloroacetate, hexachloropropylene, butylperchlorocrotonate, 1,3-dichloropropane, 1,2,3-trichloropropane, and 1,1,2-trichlorotrifluoroethane, etc. The activators may be gases or liquids at the conditions of polymerization.

The catalyst system comprising the organoaluminum cocatalyst and the vanadium-containing solid catalyst component of this invention is preferably employed for the polymerization of ethylene. However, this catalyst system can also be used to polymerize other alpha-olefins having from 3 to 20 carbon atoms, ethylene copolymers with other alpha-olefins or diolefins, and ethylene copolymers with other alpha-olefins or diolefins.

The catalyst system may be usefully employed to produce polyethylene or copolymers of ethylene. The catalyst is especially useful for the preparation of resins for blown film and blow molding applications. The olefins can be polymerized in the presence of the catalysts of this invention by any suitable known process such as, for example, suspension, solution and gas-phase processes.

The polymerization reaction employing catalytic amounts of the above-described supported catalyst can be carried out under conditions well known in the art of Ziegler polymerization, for example, in an inert diluent at a temperature in the range of 50° C. to 120° C. and a pressure of 1 to 40 atmospheres in the gas phase at a temperature range of 70° C. to 100° C. at about 1 atmosphere to 50 atmospheres and upward. Illustrative of the gas-phase processes are those disclosed in U.S. Pat. No. 4,302,565 and U.S. Pat. No. 4,302,566, which references are hereby incorporated in their entirety by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

The catalyst system of this invention is highly responsive to hydrogen, allowing for the close control of molecular weight. Other well known weight controlling agents, such as diethyl zinc, may in addition be employed.

The polymers prepared in accordance with this invention can be extruded, mechanically melted, cast or molded as desired. They can be used for plates, sheets, films, and a variety of other articles.

While the invention is described in accordance with the specific examples below, it is understood that these are only for illustrative purposes. Many alternatives, modifications and variations will be apparent to those skilled in the art in the light of the below examples and as such will fall within the general scope of the claims.

In the Examples following, the silica support was prepared by placing Davison Chemical Company MS 948 microspheroidal silica having a pore volume of 1.7 cc/g and a surface area of 335 m$^2$/g in a vertical column and fluidizing with an upward flow of nitrogen. The column was heated from ambient temperature to 150° C. at the rate of 25° C./hr. The temperature was held at 150° C. for four hours. The column was then heated from 150° C. to the final temperature at the rate of 150° C./hr. The column was held at the final temperature for four hours. The column was then cooled under nitrogen. Fluorided silica was prepared in the same way except that the silica was dry mixed with ammonium silicofluoride prior to heating.

The polymers produced by the catalyst of this invention are characterized as having "controlled" MWD. The polymer MWD is independently controlled by adjusting the amount of fluoride and the temperature to which the support and the fluorine containing compound are heated.

In the examples that follow MWD is of critical importance. While it is possible to measure MWD directly, a less expensive but less direct method involving melt flow properties is used. Melt indices have successfully been used to characterize polymer MWD. Melt index ratio (MIR) is the quotient of two melt indices (MI), each measured at a different shear rate. The measurement of polymer MI's is described in ASTM D 1328. The method measures the rate of extrusion of a resin through an orifice of specified diameter and length at a fixed temperature and under a fixed load. The MI is inversely related to the polymer molecular weight because a higher molecular weight polymer will flow less readily than a lower molecular weight polymer and thus will require greater shear forces to induce it to flow. Thus, a higher molecular weight polymer will have a lower MI. Ratios of pairs of MI's measured at different loadings are used to characterize the polymer's shear response with lower MIR's indicating narrower MWD's.

EXAMPLES 1–3

Examples 1–3 illustrate the performance of known supported vanadium catalysts which do not incorporate the MWD regulating mechanisms of the instant invention. Specifically, Examples 1–3 relate to catalyst components produced with supports which have not been fluorided.

Preparation of Catalytic Component

The silica support was dehydrated by heating as described above without the addition of fluoriding agents. The catalyst component was prepared by suspending about 2 g of the support in about 30 cc of isopentane. A solution of VOCl$_3$ in hexane (0.7 millimoles V/cc) was slowly added to the slurry while stirring to load 0.42 millimole V/g support. After 30 minutes of stirring, sufficient isobutylaluminum dichloride (25 wt% in heptane) was added slowly to the slurry while stirring to load 0.75 millimole Al/g support. After 30 minutes of stirring, sufficient silicon tetrachloride was added slowly while stirring to load 2.8 millimoles Si/g support. After 30 minutes of stirring, the slurry was residue dried under a nitrogen purge to constant weight at a final temperature of 50°–55° C. using an oil bath.

Polymerization

Polymerization of ethylene took place in a bench scale reactor using 1,000 cc isobutane as the diluent. 1.5 cc Freon-11 was used as the promoter and 2.4 millimoles TEAL as the cocatalyst. Polymerization temperature was 80° C. and polymerization time was 40 minutes. The concentration of ethylene used was 1.16 molar, the hydrogen to ethylene molar ratio was 0.026, and the hexene-1 to ethylene molar ratio was 0.36. The relatively large charge of hexene-1 was used to approximate the resin densities needed for film applications.

Unfluorided silica supports were prepared for Examples 1, 2, and 3 by dehydrating at 300° C., 500° C., and 800° C., respectively. The polymerization results are shown in the first three columns of Table 1. Comparison of the three unfluorided examples shows that the dehydration temperature has little or no effect on resin melt flow properties. No effect on catalyst productivity was found at 500° C. and 800° C. Lower productivity was observed when the catalyst was supported on the silica which had been dehydrated at 300° C. This was expected in view of the high hydroxyl content of the support and the known sensitivity of the Ziegler-Natta catalysts to acidic hydrogen.

EXAMPLES 4–7

Examples 4–6 illustrate the performance of catalyst which incorporates the MWD regulating mechanisms of the invention. Specifically, Examples 4–6 relate to catalyst components produced with supports which have been fluorided.

Preparation of Catalytic Component

The silica support was heated as described for Examples 1–3 following the addition and stirring of ammonium silicofluoride into the support. The mixture prior to dehydration was 2 wt% ammonium silicofluoride. The catalyst component was prepared as in Examples 1–3.

Polymerization

Polymerization of ethylene took place in a bench scale reactor as for Example 1–3. The molar concentration of ethylene, the hydrogen to ethylene molar ratio, and the hexene-1 to ethylene ratio were the same as in Examples 1–3.

Fluorided silica supports were prepared for Examples 4, 5, 6, and 7 by dehydrating at 350° C., 500° C., 650° C., and 800° C., respectively. The polymerization results are shown in the last four columns of Table 1. Comparison of the four fluorided examples shows that the dehydration temperature has marked effect on productivity. Productivity increased from 79 g PE/g catalyst for dehydration at 350° C. (Example 4) to 139 g PE/g catalyst for dehydration at 800° C. (Example 7). The productivity for the fluorided catalyst dehydrated at 350° C. (Example 4) approximately equalled the productivity of the unfluorided catalyst dehydrated at 500° C. and 800° C., Examples 2 and 3, respectively.

It is also to be noted that resin properties changed dramatically with fluorination temperature. Melt indices (MI) increased approximately three orders of magnitude and melt index ratios (MIR) decreased by one order of magnitude. This is in sharp contrast with the melt indices for the unfluorided catalyst (Examples 1-3) which generally decreased with increasing dehydration temperature.

A comparison of Examples 1-7 also shows that the fluorided supports produced resin with lower density.

Polymerization of ethylene took place in bench scale reactors using 1,000 cc isobutane as the diluent. Polymerization temperature was 80° C. and polymerization time was 40 minutes. Promoter and cocatalyst were the same as previous examples. The molar concentration of ethylene used was 1.17, the hydrogen to ethylene molar ratio was 0.039, and the hexene-1 to ethylene ratio was 0.080. The relatively small charge of hexene-1 was used to approximate the resin density needed for blow molding applications.

Unfluorided silica supports were prepared for Examples 8, 9 and 10 by dehydrating at 500° C. The polymerization results are shown in Table 2. Note that Examples 8 and 9 are duplicates of each other and serve to give some idea of the reproducibility of the results.

Comparison of the three unfluorided examples with the five fluorided examples (Examples 11-15) shows

TABLE 1

|  | UNFLUORIDED SILICA | | | FLUORIDED SILICA | | | |
|---|---|---|---|---|---|---|---|
|  | EXAMPLE | | | | | | |
|  | 1 | 2 | 3 | 4 | 5 | 6 | 7 |
| Dehydration/Fluorination Temp. (°C.) | 300 | 500 | 800 | 350 | 500 | 650 | 800 |
| PE Yield (g) | 50 | 75 | 78 | 79 | 99 | 88 | 139 |
| Reactivity (kg/PE/gV · hr · $C_2$) | 39 | 59 | 61 | 61 | 77 | 68 | 108 |
| Melt Index | | | | | | | |
| 2.1 kg | 0.68 | 0.08 | 0.24 | 0.21 | 3.40 | 10.2 | 135 |
| 5 kg | 3.35 | 0.43 | 1.28 | 1.14 | 18.0 | 48.0 | 514 |
| 21 kg | 99.5 | 15.3 | 41.9 | 35.3 | 329 | 632 | 2055 |
| Melt Index Ratio | | | | | | | |
| 21/2.1 | 146 | 191 | 175 | 168 | 97 | 62 | 15 |
| 21/5 | 29.7 | 35.6 | 32.7 | 31.0 | 18.3 | 13.2 | 4.0 |
| Resin Density (g/cc) | 0.9483 | 0.9482 | 0.9490 | 0.9474 | 0.9478 | 0.9400 | 0.9414 |

EXAMPLES 8-15

Examples 8-15 illustrate the effect of fluoriding the catalyst supports and the dependence of catalyst performance on the fluorination temperature.

Preparation of Catalytic Component

The silica support in Examples 8-10 were dehydrated by heating as described above without the addition of fluoriding agents. The catalyst components for Examples 8 and 9 were prepared as described in Examples 1-3 above. The catalyst component for Example 10 was similarly prepared but with higher loadings. Specifically, the catalyst in Example 10 was loaded to 0.77 millimoles V, 1.34 millimole Al, and 4.8 millimole Si/g support. The fluorided supports (Examples 11-15) were prepared as in Examples 4-7 above. The catalyst was made as described in Examples 4-7 above.

Polymerization that the fluorided catalysts have higher productivity. At a dehydration temperature of 500° C. (Example 13), the productivity of the fluorided catalyst is much higher than for the corresponding unfluorided catalysts (Examples 8-9), and significantly higher than for the more heavily loaded catalyst of Example 10.

Further comparison of the three unfluorided examples with the five fluorided examples (Examples 11-15) shows that while the unfluorided catalysts gave resins with melt indices at 21 kg ($I_{21}$) of 33-155 and MIR's ($I_{21}/I_{2.1}$) of 235-168, the fluorided catalysts had corresponding values of 56-373 and 150-79, respectively. The fluorided catalyst thus are capable of producing resin with lower MIR's, which are indicative of narrower MWD's.

TABLE 2

|  | UNFLUORIDED SILICA | | | FLUORIDED SILICA | | | | |
|---|---|---|---|---|---|---|---|---|
|  | EXAMPLE | | | | | | | |
|  | 8 | 9 | 10 | 11 | 12 | 13 | 14 | 15 |
| Dehydration/Fluorination Temp. (°C.) | 500 | 500 | 500 | 350 | 450 | 500 | 650 | 800 |
| PE Yield (g) | 66 | 55 | 79 | 68 | 82 | 106 | 93 | 167 |
| Reactivity (kg/PE/gV · hr · $C_2$) | 51 | 43 | 34 | 53 | 64 | 82 | 72 | 130 |
| Melt Index | | | | | | | | |
| 2.1 kg | 0.14 | 0.28 | 0.92 | 0.72 | 0.35 | 1.42 | 3.34 | 4.66 |
| 5 kg | 0.89 | 1.66 | 5.38 | 5.94 | 2.06 | 7.56 | 17.6 | 22.1 |
| 2.1 kg | 32.9 | 55.3 | 155 | 108 | 56.4 | 167 | 373 | 368 |
| Melt Index Ratio | | | | | | | | |
| 21/2.1 | 235 | 200 | 168 | 150 | 161 | 118 | 111 | 79 |
| 21/5 | 37.0 | 33.3 | 28.8 | 18.2 | 27.4 | 22.1 | 21.2 | 16.6 |
| Resin Density (g/cc) | 0.9584 | 0.9589 | 0.9587 | 0.9577 | 0.9572 | 0.9589 | 0.9609 | 0.9613 |

EXAMPLES 16-21

Examples 16-21 illustrate the effect of the amount of fluorination applied to the catalyst supports.

Preparation of Catalytic Component

The silica support for Example 16 was dehydrated as described above to a temperature of 800° C. The silica support for Examples 17-21 were fluorinated by heating as described above to a temperature of 650° C. in the presence of various amounts of ammonium silicofluoride, ranging from 0.5 to 3.0 wt%, or 0.3 to 1.8 wt% F added. The catalyst components for Examples 16-21 were prepared as described in Examples 4-7 above. The catalyst was made as described in Examples 4-7 above.

Polymerization

Polymerization of ethylene took place in a bench scale reactor using 1,000 cc isobutane as the diluent. Polymerization temperature was 80° C. and polymerization time was 40 minutes. Promoter and cocatalyst were the same as previous examples. The molar concentration of ethylene used was 1.25, the hydrogen to ethylene molar ratio was 0.014, and the hexene-1 to ethylene molar ratio was 0.33.

An examination of the results shown in Table 3 shows that catalyst productivity does not appear to be affected at 0.5 wt% ammonium silicofluoride (ASF) loading but that a noticeable increase does occur at and above the 1.0 wt% level. However, the fluorination effect on catalyst hydrogen response and comonomer response is immediate as indicated by the higher MI's and lower resin density of Example 17 versus Example 16.

TABLE 3

|  | EXAMPLE | | | | | |
| --- | --- | --- | --- | --- | --- | --- |
|  | 16 | 17 | 18 | 19 | 20 | 21 |
| ASF Added (wt %) | 0 | 0.5 | 1.0 | 1.5 | 2.0 | 3.0 |
| F Measured (wt %) | 0.013 | 0.42 | 0.67 | 0.94 | 1.1 | 0.84 |
| PE Yield (g) | 59 | 62 | 70 | 84 | 133 | 133 |
| Productivity (kg PE/gV · hr · C$_2$) | 46 | 48 | 54 | 65 | 103 | 103 |
| Melt Index |  |  |  |  |  |  |
| 2.1 kg | 0.034 | 0.26 | 0.72 | 0.82 | 1.57 | 1.10 |
| 5 kg | 0.19 | 1.36 | 3.82 | 4.16 | 7.86 | 5.7 |
| 21 kg | 6.09 | 38.4 | 96.0 | 89.0 | 157 | 131 |
| Melt Index Ratio |  |  |  |  |  |  |
| 21/2.1 | 179 | 148 | 133 | 108 | 103 | 119 |
| 21/5 | 32.0 | 28.2 | 25.1 | 21.4 | 20.0 | 23.0 |
| Resin Density (g/cc) | 0.9452 | 0.9414 | 0.9383 | 0.9350 | 0.9390 | 0.9409 |

The principle of the invention, detailed descriptions of specific applications of the principle, and the best mode in which it is contemplated to apply that principle have been described. It is to be understood that the foregoing is illustrative only and that other means and techniques can be employed without departing from the true scope of the invention defined in the following claims.

What is claimed is:

1. A fluorided supported vanadium catalyst component for polymerizing olefins to polyolefins of controlled molecular weight distribution as a function of the fluorine to vanadium metal ratio of said catalyst component and of the fluorination temperature, comprising a product of reacting:
   (a) a fluorided support material comprising silica; and
   (b) a vanadium compound of the general formulas:

$$\overset{O}{\underset{\|}{VCl_x(OR)_{3-x}}}$$

where "x" is a number from 0 to 3 and R is a hydrocarbon radical, $VCl_y(OR)_{4-y}$ where "y" is a number from 3 to 4 and R is a hydrocarbon radical, $$\overset{(O)_{3-z}}{\underset{\|}{V(AcAc)_z}}$$

where "z" is a number from 2 to 3 and (AcAc) is an acetyl acetonate group, $$\overset{O}{\underset{\|}{VCl_2(AcAc)}} \quad \text{or} \quad \overset{O}{\underset{\|}{VCl(AcAc)_2}}$$

where (AcAc) is an acetyl acetonate group, or VCl$_3$.nL where "n" is a number from 2 to 3 and L is a Lewis base which can form hydrocarbon-soluble complexed with VCl$_3$;

wherein fluorine and vanadium are present in said product of reaction in a mole ratio of fluorine to vanadium of from 0.005 to about 20, and wherein there is no substantial reaction of the fluorided support material with another catalyst component prior to contact between the vanadium compound and the fluorided support material.

2. The supported catalyst component of claim 1 further comprising a halogenating agent.

3. The supported catalyst component of claim 1 wherein said support material is fluorided by dry mixing a fluorine containing compound with said support material and heating the mixture to a temperature of between 200° C. and 1,000° C.

4. The supported catalyst component of claim 1 further comprising a product of reacting a slurry of said support material and an organoaluminum compound of the formula R'$_m$AlX$_{3-m}$ wherein R' represents an alkyl group, cycloalkyl group or aryl group, X represents a halogen atom and "m" represents a number equal to or greater than 1 and less than or equal to 3.

5. The supported catalyst component of claim 1, wherein support material consists of fine, dehydrated support material, selected from the group consisting of silica, and silica-alumina mixtures.

6. The supported catalyst component of claim 1 wherein said support material is fluorided using a fluorine containing compound such as hydrogen fluoride, fluorides of ammonium and metals, and complex fluorides of ammonium and metals.

7. The supported catalyst component of claim 1, wherein the support material is silica.

8. The supported catalyst component of claim 1, wherein vanadium metal is present in the product of reaction in a concentration of from about 0.05 to about 2.0 millimoles of vanadium per gram of dried support.

9. The supported catalyst component of claim 1, wherein aluminum metal is present in the product of reaction in a concentration of from about 0.05 to about 5.0 millimoles of aluminum metal per gram of dried support.

10. The supported catalyst component of claim 1, wherein fluorine and vanadium are present in said product of reaction in a mole ratio of fluorine to vanadium of from 0.005 to about b 10.0.

11. A process for preparing a supported catalyst material, comprising the steps of:
   (a) fluoriding a support material comprising silica; and
   (b) treating said fluorided support material with (i) a vanadium compound of the general formulas:

where "x" is a number from 0 to 3 and R is a hydrocarbon radical,

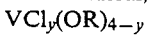

where "y" is a number from 3 to 4 and R is a hydrocarbon radical,

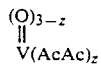

where "z" is a number from 2 to 3 and (AcAc) is an acetyl acetonate group,

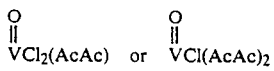

where (AcAc) is an acetyl acetonate group, or VCl$_3$.nL where "n" is a number from 2 to 3 and L is a Lewis base which can form hydrocarbon-soluble complexes with VCl$_3$;

and wherein there is no substantial reaction of the fluorided support material with another catalyst component prior to contact between the vanadium compound and the fluorided support material.

12. The process of claim 11 wherein the fluorided support material is combined with a hydrocarbon to form a hydrocarbon slurry, the hydrocarbon slurry is treated with the vanadium compound and thereafter treating said hydrocarbon slurry with a halogenating agent.

13. The process of claim 11 wherein said fluoriding of said support material is achieved by dry mixing a fluorine containing compound with said support material and heating the mixture to a temperature to between 200° C. and 1,000° C.

14. The process of claim 11 comprising forming a hydrocarbon slurry of fluorided support, treating the hydrocarbon slurry with the vanadium compound and thereafter reacting said hydrocarbon slurry with an organoaluminum compound of the formula R′$_m$AlX$_{3-m}$ wherein R′ represents an alkyl group, cycloalkyl group or aryl group, X represents a halogen atom and "m" represents a number equal to or greater than 1 or less than or equal to 3.

15. The process of claim 11 wherein the said support material consists of fine, dehydrated support material, selected from the group consisting of silica and silica-aluminum mixtures.

16. The process of claim 11 wherein said fluoriding of said support material is achieved by using a fluorine containing compounds such as hydrogen fluoride, fluorides of ammonium and metals, and complex fluoride, of ammonium and metals.

17. The process of claim 11 wherein said support material consists of silica.

18. The process of claim 11 wherein said vanadium metal compound is added to yield a concentration from about 0.05 to about 2.0 millimoles of vanadium per gram of dried support.

19. The process of claim 11 wherein said aluminum metal is added to yield a concentration from about 0.05 to about 5.0 millimoles of aluminum metal per gram of dried support.

20. The process of claim 11 wherein said fluorine and vanadium are added to yield a mole ratio of fluorine to vanadium of from 0.005 to about 10.0.

* * * * *